United States Patent
Chen et al.

(10) Patent No.: US 8,818,024 B2
(45) Date of Patent: Aug. 26, 2014

(54) METHOD, APPARATUS, AND COMPUTER PROGRAM PRODUCT FOR OBJECT TRACKING

(75) Inventors: Wei-Chao Chen, Los Altos, CA (US); Natasha Gelfand, Sunnyvale, CA (US); Kari Antero Pulli, Palo Alto, CA (US); Duy-Nguyen Ta Huynh, Atlanta, GA (US)

(73) Assignee: Nokia Corporation, Espoo (FI)

( * ) Notice: Subject to any disclaimer, the term of this patent is extended or adjusted under 35 U.S.C. 154(b) by 820 days.

(21) Appl. No.: 12/402,921

(22) Filed: Mar. 12, 2009

(65) Prior Publication Data

US 2010/0232643 A1 Sep. 16, 2010

(51) Int. Cl.
G06K 9/00 (2006.01)
G06T 7/20 (2006.01)
G06K 9/46 (2006.01)

(52) U.S. Cl.
CPC .............. *G06K 9/4671* (2013.01); *G06T 7/204* (2013.01); *G06T 2207/10016* (2013.01)
USPC ............................ 382/103; 382/107; 348/143

(58) Field of Classification Search
USPC .................................. 382/103, 107; 348/143
See application file for complete search history.

(56) References Cited

U.S. PATENT DOCUMENTS

| | | | |
|---|---|---|---|
| 6,711,293 B1 | 3/2004 | Lowe | |
| 7,162,338 B2 | 1/2007 | Goncalves et al. | |
| 7,454,037 B2 * | 11/2008 | Higgins | 382/103 |
| 7,466,244 B2 * | 12/2008 | Kimchi et al. | 340/995.1 |
| 7,929,728 B2 * | 4/2011 | Guo et al. | 382/103 |
| 2006/0233423 A1 * | 10/2006 | Najafi et al. | 382/103 |
| 2007/0009159 A1 | 1/2007 | Fan | |
| 2008/0291272 A1 * | 11/2008 | Krahnstoever et al. | 348/143 |

FOREIGN PATENT DOCUMENTS

| | | |
|---|---|---|
| EP | 1 276 324 A1 | 1/2003 |
| EP | 1 548 616 A2 | 6/2005 |
| EP | 1 594 078 A2 | 11/2005 |
| EP | 1 850 270 A1 | 10/2007 |
| WO | WO 03/065063 A2 | 8/2003 |
| WO | WO 2007/128452 | 11/2007 |
| WO | WO 2007/130688 A2 | 11/2007 |
| WO | WO 2009/129243 A1 | 10/2009 |

OTHER PUBLICATIONS

Najafi et al., "Fusion of 3D and Appearance Models for Fast Object Detection and Pose Estimation", 2006, Springer, LNCS 3852, 415-426.*
Mikolajczyk et al., "An Affine Invariant Interest Point Detector", 2002, Springer, ECCV 2002, LNCS 2350, 128-142.*
Mikolajczyk et al., "An affine invariant interest point detector", 2002, Proceedings of the 7th European Conference on Computer Vision.*

(Continued)

*Primary Examiner* — Jason Repko
*Assistant Examiner* — Katrina Fujita
(74) *Attorney, Agent, or Firm* — Alston & Bird LLP

(57) ABSTRACT

A method for object tracking is provided. The method may include identifying a first interest point, receiving a video frame, and detecting, via a processor, a second interest point in the video frame using a scale space image pyramid. The method may further include matching the second interest point with the first interest point, and determining a motion estimation based on the matched interest points. Similar apparatuses and computer program products are also provided.

16 Claims, 4 Drawing Sheets

(56) References Cited

OTHER PUBLICATIONS

Lowe et al., "Distinctive Image Features from Scale-Invariant Keypoints", 2004, International Journal of Computer Vision 60(2), 91-110.*

Ahonen et al., "Rotation invariant image description with local binary pattern histogram fourier features," in Image Analysis, SCIA 2009 Proceedings, Lec 75,2009, pp. 61-70.

Nguyen et al., "SURFTrac: Efficient Tracking and Continuous Object Recognition using Local Feature Descriptors", IEEE CVPR 2009, Miami, Florida (2009).

Banerjee et al., "Clustering with bregman divergences," in Journal of Machine Learning Research, 2004, pp. 234-245.

Takacs et al., "Outdoors augmented reality on mobile phone using loxel-based visual feature organization", In Proceeding of ACM international conference on Multimedia Information Retrieval (MIR), pp. 427-434,2008.

Chandrasekhar et al., "CHoG: Compressed histogram of gradients—Low Bit-Rate Feature Descriptors", Conference: Computer Vision and Pattern Recognition—CVPR, pp. 2504-2511,2009.

Birchfield, "KLT: An Implementation of the Kanade-Lucas-Tomasi Feature Tracker," 2007, http://ww .ces.clemson.edu/—stb/klt.

Brasnett et al., "A Robust Visual Identifier Using the Trace Transform," in Visual Information Engineering Conference (VIE), Jul. 2007.

Brown et al., "Automatic Panoramic Image Stitching Using Invariant Features," in International Journal of Computer Vision, vol. 74, No. 1, 2007, pp. 59-77.

Calonder et al., "Compact Signatures for High-speed Interest Point Description and Matching," in Proc. International Conf. on Computer Vision (ICCV), 2009.

Huang et al., "Image Retrieval by Texture Similarity", Pattern Recognition, Elsevier, Mar. 2003, vol. 36, No. 3, pp. 665-679.

Chang et al., "Direction Adaptive Partitioned Block Transform for Image Coding," in Proceedings of ICIP 2008, San Diego, USA, 2008.

Tao et al., "Recognition and Retrieval of Textured Images Using Gradient Indexing", Image Processing, Proceedings, Oct. 4, 1998, vol. 1, pp. 57-61, International Conference on Chicago, IL, USA, Oct. 1998.

Yeo et al., "Rate-Efficient Visual Correspondences Using Random Projections," IEEE, 2008.

Fischler et al., "Random Sample Consensus: A paradigm for model fitting with applications to image analysis and automated cartography," Communications of ACM, vol. 24, No. 6, pp. 381-395, 1981.

Gagie, "Compressing Probability Distributions," Inf. Process. Lett., vol. 97, No. 4, pp. 133-137, 2006.

Hua et al, "Discriminant Embedding for Local Image Descriptors," in Proc. of International Conference on Computer. Vision (ICCV). IEEE Computer Society, 2007.

Jegou et al., "Hamming embedding and weak geometric consistency for large scale image search," in Proc. of European Conference on Computer Vision (ECCV), Berlin, Heidelberg, 2008, pp. 304-317.

Ke et al., "PCA-SIFT: A More Distinctive Representation for Local Image Descriptors," in Proc. Of Conference on Computer Vision and Pattern Recognition (CVPR), vol. 02. IEEE Computer Society, 2004, pp. 506-513.

Kingsbury, "Rotation-Invariant Local Feature Matching with Complex Wavelets," in Proc. European Conf. Signal Processing (EUSIPCO), 2006.

Klein et al., "Parallel tracking and mapping on a camera phone," in Proc. Eigth IEEE and ACM International Symposium on Mixed and Augmented Reality (ISMAR'09), Orlando, Oct. 2009.

Lowe, "Distinctive Image Features from Scale-Invariant Keypoints," International Journal of Computer Vision, vol. 60, No. 2, pp. 91-110,2004.

Mikolajczyk et al., "A Comparison of Affine Region Detectors," Int. J. Comput. Vision, vol. 65, No. 1-2, pp. 43-72,2005.

Mikolajczyk et al., "Performance Evaluation of Local Descriptors," IEEE Trans. Pattern Anal. Mach. Intell.,vol. 27, No. 10, pp. 1615-1630,2005.

Nister et al., "Scalable Recognition with a Vocabulary Tree," in IEEE Conference on Computer Vision and Pattern Recognition (CVPR), vol. 2,2006, pp. 2161-2168.

Philbin et al., "Lost in quantization—Improving particular object retrieval in large scale image databases," in CVPR, Anchorage, Alaska, Jun. 2008.

Philbin et al., "Object Retrieval with Large Vocabularies and Fast Spatial Matching," in CVPR, Minneapolis, Minnesota, 2007.

Rosten et al., "Machine Learning for High Speed Corner Detection," in 9th Euproean Conference on Computer Vision, vol. 1, Apr. 2006, p. 430443.

Se et al., "Vision-Based Global Localization and Mapping for Mobile Robots," in IEEE Transactions on Robotics, vol. 21, No. 3, 2007, pp. 364-375.

Shakhnarovich et al., "Learning Task-Specific Similarity," Thesis, 2005.

Shakhnarovich et al., "Fast Pose Estimation with Parameter-Sensitive Hashing," in ICCV '03:Proceedings of the Ninth IEEE International Conference on Computer Vision. W IEEE Computer Society, 2003, p. 750.

Snavely et al., "Photo Tourism: Exploring Photo Collections in 3D," in SIGGRAPH Conference Proceedings. New York, NY, USA: ACM Press, 2006, pp. 835-846.

Takacs et al.,"Feature Tracking for Mobile Augmented Reality Using Video Coder Motion Vectors," in ISMAR '07: Proceedings of the Sixth IEEE and ACM International Symposium on Mixed and Augmented Reality, 2007.

Taylor et al., "Robust Feature Matching in 2.3us," in Conference on Computer Vision and Pattern Recognition, Jun. 2009.

Taylor et al., "Multiple target localization at over 100 FPS," in British Machine Vision Conference, London, UK, Sep. 2009.

Tola et al., "A Fast Local Descriptor for Dense Matching," in Conference on Computer Vision and Pattern Recognition, 2008.

Torralba et al., "Small Codes and Large Image Databases for Recognition," in CVPR, 2008.

Tsai et al., "Rate Efficient Real Time CD Cover Recognition on a Camera Phone," in ACM Multimedia Vancouver, British Columbia, Canada, Oct. 2008.

Wagner et al., "Multiple target detection and tracking with guaranteed framerates on mobile phones," in ISMAR, Orlando, FL, USA, 2009.

Winder et al., "Learning Local Image Descriptors," in Computer Vision and Pattern Recognition, 2007. CVPR '07. IEEE Conference on, 2007, pp. 1-8. [Online]. Available: http://dx.doi.org/10.1109/CVPR.2007.382971.

Winder et al., "Picking the best DAISY," in Conference on Computer Vision and Pattern Recognition, 2009.

IEEE802.11—IEEE Standard for Information technology—Telecommunications and information exchange between systems—Local and metropolitan area networks—Specific requirements Part 11: Wireless LAN Medium Access Control (MAC) and Physical Layer (PHY) Specifications, Jun. 12, 2007.

IEEE802.15.1 IEEE Standard for Information Technology—Telecommuncations and Information exchange between systems—local and metropolitan area networks—specific requirements—Part 15.1: Wireless Medium Access Control (MAC) and Physical layer (PHY) Specifications for Wireless Personal Area Networks (WPANs), Jun. 15, 2005.

IEEE802.16—IEEE Standard for Local and and metropolitan are networks Part 16: Air Interface for Broadband Wireless Access Systems, May 29, 2009.

International Search Report and Written Opinion of the International Searching Authority from corresponding Patent Cooperation Treaty Application No. PCT/IB2009/007434, dated Mar. 2, 2010, 18 pages.

International Search Report and Written Opinion received in Corresponding Patent Cooperation Treaty Application No. PCT/IB2010/055280, dated Mar. 4, 2011, 15 pages.

Brown, Matthew, "Multi-Image Matching using Multi-Scale Oriented Patches", Proceedings of the 2005 IEEE Computer Society Conference on Computer Vision and Pattern Recognition, 1063-6919/05, pp. 510-517.

(56) References Cited

OTHER PUBLICATIONS

Wagner, Daniel, "Pose Tracking from Natural Features on Mobile Phones", 7$^{th}$ IEEE International Symposium on Mixed and Augmented Reality, ISBN 978-1-4244-2859-5/08, Sep. 15-18, 2008. pp. 125-134.

Wagner, Daniel, "Real-Time Detection and Tracking for Augmented Reality on Mobile Phones", In: IEEE Transactions on Visualization and Computer Graphics, ISSN 1077-2626, vol. 16, No. 3, May/Jun. 2010, pp. 355-368.

Takacs, Gabriel, "Unified Real-Time Tracking and Recognition with Rotation-Invariant Fast Features", In: 2010 IEEE Conference on Computer Vision and Pattern Recognition (CVPR), Jun. 13-18, 2010, pp. 934-941.

Bay et al., "SURF: Speeded Up Robust Features," *ECCV*, (1), pp. 404-417, 2006.

\* cited by examiner

METHOD, APPARATUS, AND COMPUTER PROGRAM PRODUCT FOR OBJECT TRACKING

TECHNICAL FIELD

Embodiments of the present invention relate generally to image analysis, and, more particularly, relate to a method, apparatus, and a computer program product for tracking an object depicted in video frames.

BACKGROUND

Advances in mobile electronic devices have brought about a tremendous expansion in the functionality available to users of the devices. Many mobile devices include technology to make a phone call, browse the internet, determine a current location, or the like. Some mobile electronic devices also include functionality to capture video images using digital camera technology. With increased availability to capture digital images, many developers are considering new ways to leverage digital cameras as an input devices geared toward functionality in addition to merely capturing events for subsequent viewing.

Many developers are now considering new ways for analyzing data captured by digital camera. One mechanism that has been evolving is object recognition. In this regard, a digital image is processed in a manner such that objects within the image may be identified. For example, a user may take a digital image of a city building. Attributes of the building extracted from the image may be compared to a predefined attributes in a database. If an attribute match is found, the object, in this case the building, may be identified. Having identified the object, a variety of functionality may become available relation to the object.

Many conventional solutions for implementing object recognition utilize substantial computing power to extract the image attributes and analyze the digital image. Further, when a digital video feed is considered, which is essentially a series of digital still image frames, the computing power utilized by conventional object recognition solutions can increase accordingly. When the video feed includes motion, conventional solutions may be required to re-analyze each frame of the video anew in order to perform object recognition in order to track the motion of the recognized object.

BRIEF SUMMARY

Methods, apparatuses, and computer program products are described that perform object tracking. Example embodiments of the present invention perform object tracking in a manner that reduces the computing power required to track an object. In this regard, one or more interest points associated with the object may be detected in a series of video frames. An interest point may be a repeatable, invariant attribute of an object. The detection of at least one of the interest points may be performed using a scale space image pyramid. In some embodiments, a neighborhood may also be defined that is a portion of the scale space image pyramid, and the neighborhood may be used to detect an interest point. The interest points associated with the respective frames may be matched to determine whether the interest points are associated with each other. Once matched, a motion estimation may be determined to thereby track the motion of an associated object. In some example embodiments, a feature descriptor may be generated based on at least one interest point, and an object may be identified that is associated with the feature descriptor. Further, a video frame may be augmented to include a label associated with the identified object where the label is positioned in the video frame based on the matched interest points.

In some example embodiments, detection of an interest point may include using a scale space pyramid that is a Hessian-Affine, Harris-Affine, approximate Hessian scale space, or the like. Further, in some example embodiments, matching of the interest points may be performed by identifying a relationship between respective dominant curvatures of the interest points. Further, the matching of interest points may include comparing the interest points using Normalized Cross Correlation (NCC). Additionally, computation of a feature descriptor may be performed such that the feature descriptor is a Speeded Up Robust Feature (SURF) feature, a Scale-Invariant Feature Transform (SIFT) feature, a Gradient Location and Orientation Histogram (GLOH) feature, or the like.

Various example embodiments of the present invention are described herein. One example embodiment is a method for object tracking. The example method includes identifying a first interest point, receiving a video frame, and detecting, via a processor, a second interest point in the video frame using a scale space image pyramid. The example method further includes matching the second interest point with the first interest point, and determining a motion estimation based on the matched interest points.

Another example embodiment is an example apparatus for object tracking. The example apparatus comprises a processor and a memory storing executable instructions that, in response to execution by the processor, cause the example apparatus to perform various functions. The example apparatus is caused to identify a first interest point, receive a video frame, and detect a second interest point in the video frame using a scale space image pyramid. The example apparatus is further caused to match the second interest point with the first interest point, and determine a motion estimation based on the matched interest points.

Another example embodiment is an example computer program product for object tracking. The example computer program product comprises at least one computer-readable storage medium having executable computer-readable program code instructions stored therein. The computer-readable program code instructions of the example computer program product are configured to identify a first interest point, receive a video frame, and detect a second interest point in the video frame using a scale space image pyramid. The computer-readable program code instructions are further configured to match the second interest point with the first interest point, and determine a motion estimation based on the matched interest points.

Yet another example embodiment is an apparatus for object tracking. The example apparatus includes means for identifying a first interest point, means for receiving a video frame, and means for detecting a second interest point in the video frame using a scale space image pyramid. The example apparatus further includes means for matching the second interest point with the first interest point, and means for determining a motion estimation based on the matched interest points.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
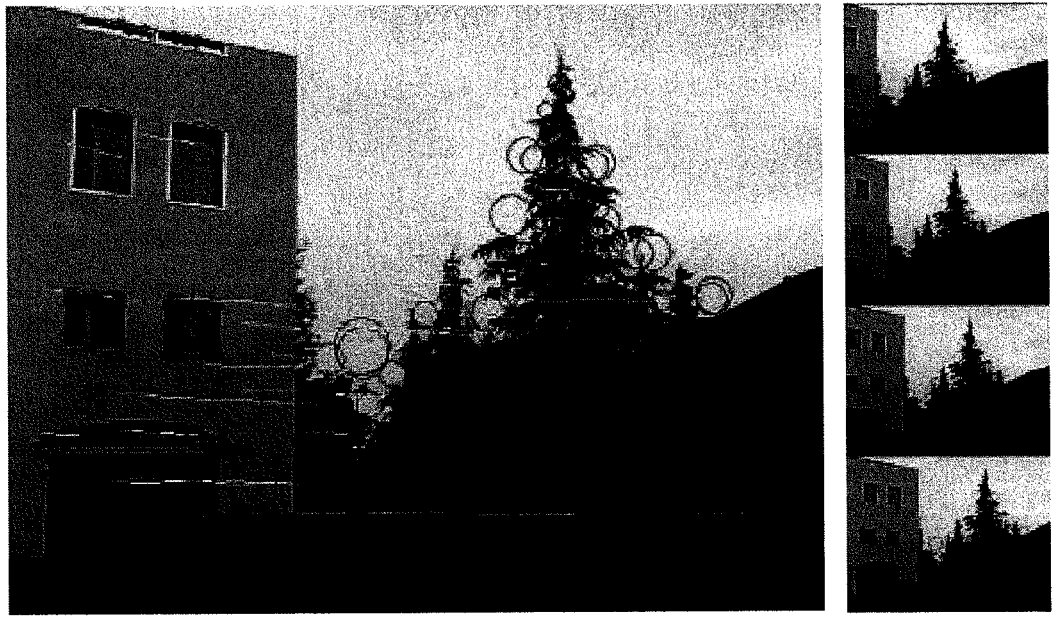
FIG. 1a illustrates the results of an example interest point and feature computation based on a captured image according to various example embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Example embodiments of the present invention describe mechanisms for continuous image, or object, recognition and feature descriptor tracking in a video input stream comprised of video frames or the like by culling and reducing the search space of possible interest points to an area or volume inside of a scale space image pyramid. Example embodiments search and match candidate features in local neighborhoods inside of a three-dimensional image pyramid without computing feature descriptors. Candidate features may also be validated by fitting to a motion model. As a result, tracked interest points may be more repeatable and resilient to noise, and descriptor computation can be more efficient and require less computing power. Various example embodiments recognize these benefits because select areas of the image pyramid that contain features are searched. Example embodiments of the present invention also take advantage of video coherence and similarities between frames of video to efficiently track identified objects.

Robust feature descriptors, such as Scale-Invariant Feature Transform (SIFT), Speeded Up Robust Feature (SURF), and Gradient Location and Orientation Histogram (GLOH) features are currently being used in applications such as image recognition, multi-view stereo, and image registration. These descriptors may be stable under viewpoint and lighting changes, and as such, the descriptors may be capable of coping with a significant amount of image variability. At the same time, discriminative power may be achieved by representing feature points as high-dimensional vectors. The combination of robustness and discriminative power often makes utilization of these features suitable for searching large heterogeneous image databases.

Example embodiments of the present invention, use aspects of the robust feature descriptors in real-time object recognition and tracking applications. Given a database of images of labeled objects, such as buildings in an outdoor environment, and an input video stream, example embodiments may recognize objects present in the video, augment the video stream with labels indicating the objects, and maintain and update those labels as the video pans across the scene. According to various example embodiments, image matching may be performed against a database to identify new objects that appear in the video, and object tracking may be performed to update the positions of the labels of recognized objects in the consecutive video frames. As such, based on interest points associated with the generation of robust features, example embodiments of the present invention track objects at interactive frame rates.

Figure 1B:
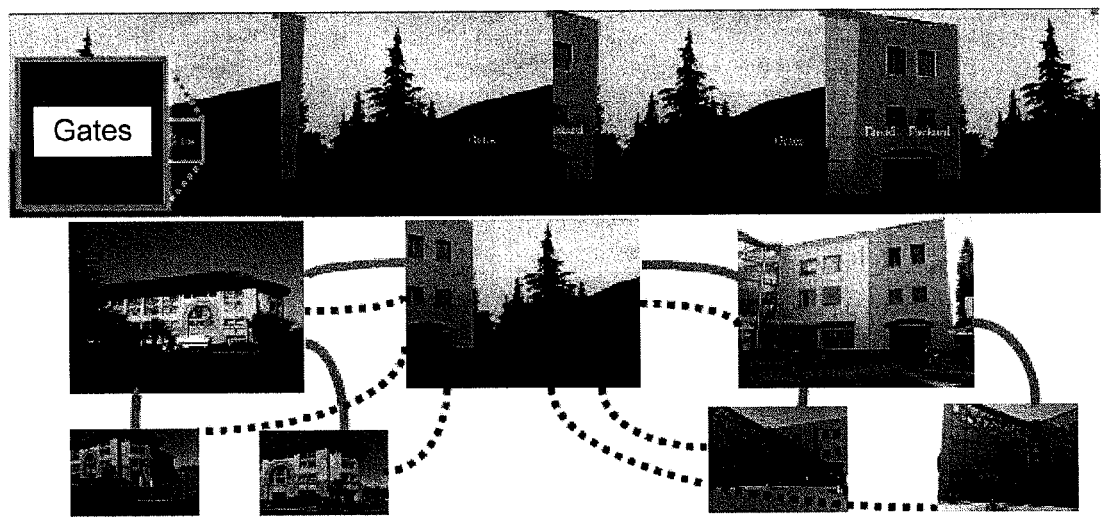
FIG. 1b illustrates an example video frame augmentation and an example organization of images according to various example embodiments of the present invention.

FIGS. 1a and 1b illustrate an example process where an image recognition is performed and a video frame is augmented to include a label. In this regard, FIG. 1a includes visual indications of computed feature descriptors as circles and lines overlaying the rendered image data. These feature descriptors may be used to identify objects within the image by, for example, searching a database of objects for an object having similar feature descriptors. When a match is identified in the database, that video frame may be augmented to include the label in association with the identified object. FIG. 1b illustrates the decomposition of the image data and the introduction of a label (e.g., "Gates") to the video frame.

To track objects across multiple video frames, example embodiments may perform pairwise image matching given any two consecutive video frames. However, example embodiments of the present invention avoid common drawbacks of frame-to-frame matching, which may involve wasted computation due to a failure to exploit coherence in the video. Various example embodiments consider the changes in the video frames and determine whether to perform the computationally intensive process of robust feature descriptor generation. According to some example embodiments of the present invention, expensive robustness properties of the descriptors are not needed for frame-to-frame matching. Furthermore, reductions in the number of generated robust features may also reduce the computation requirements due to the presence of image noise, which can cause the generation of useless robust features that were generated merely due to noise in the image. As a result, detection and computation of robust descriptors for each frame of the video need not be necessary, which, in some example embodiments, carries the benefit of performing object tracking at interactive frame rates. Further, example embodiments of the present invention also avoid the need to recalculate robust features for tracking purposes, which can require an analysis of the full scene geometry to update the position of an object in a video frame.

Accordingly, example embodiments of the present invention enable tracking of robust descriptors at interactive frame rates by detecting interest points at locations in each frame where the descriptors are likely to appear. Tracking may be performed in a scale-space image pyramid, and achieve the robustness of the direct frame-to-frame matching method while reducing computation significantly. The detected interest points may be scale-invariant, and may be inherently matched and tracked across video frames. In this manner, descriptor computation may be decoupled from interest point detection so that feature descriptors are computed for the purpose of object recognition, but need not be computed for object tracking.

A feature descriptor algorithm may include two consecutive steps, namely interest point detection followed by descriptor computation. An interest point detection algorithm may extract regions of interest that tend to be repeatable and invariant under transformations such as brightness or perspective changes. In descriptor computation, each extracted interest point may define a circular or affine region from which one descriptor may be computed. While these operations may be discrete, various example embodiments may intermingle aspects of interest point detection and descriptor computation. For example, a SIFT descriptor may be computed using Hessian-Affine interest points.

Example embodiments of the present invention use image pyramids during interest point detection to achieve scale-invariance. In this regard, embodiments of the present invention may utilize image pyramids in accordance with, for example, Hessian-Affine, Harris-Affine, and, approximate Hessian algorithms. An image pyramid may be formed by downsampling the input image to a progressively lower resolution. In this regard, the image pyramid may be treated as a stack of same-sized images $S_k(\cdot)$, each filtered from the original image $I_k$ with a different scale of zero-mean Gaussian as follows:

$$S_k(x,y,\sigma)=I_k(x,y)*G(0,\sigma^2),$$

where k indicates the video frame, x, y, $\sigma$ indicate the location, and $G(0,\sigma^2)$ is a Gaussian distribution with zero mean and $\sigma^2$ variance. The interest point response $R_k$ may have the same image stack data layout, and may be computed by applying the response computation function $f(\cdot)$ over the stack of images $S_k$ such that $$R_k(x,y,\sigma)=f \cdot S_k(x,y,\sigma).$$

Local maxima in the function $R_k$ may represent relatively stable regions and may be extracted as interest points. Because the bandwidth of function $R_k$ may be lower at higher values of $\sigma$, the sampling rate for maxima computation may be naturally reduced at higher $\sigma$ to increase efficiency. The extracted interest points may then be refined with smooth local interpolation.

Interest point detection may be performed such that the interest points are tracked across video frames efficiently. Although example embodiments of the present invention may utilize various algorithms for interest point detection, example embodiments described herein are described with respect to use of image pyramids with an approximate Hessian detector in SURF scheme. In some example embodiments, the approximate Hessian detector in SURF scheme is utilized due to the scheme's efficiency and good interest point repeatability. Additionally, by using SURF part of $R_k$ may be computed directly without having to produce the intermediate Gaussian stack $S_k$. In this regard, the scheme may compute the scale-normalized Hessian matrix $H_k$ $$H_k(x, y, \sigma) = \frac{1}{\sigma^2}\begin{bmatrix} \frac{\partial^2}{\partial x^2}S_k(x, y, \sigma) & \frac{\partial^2}{\partial x \partial y}S_k(x, y, \sigma) \\ \frac{\partial^2}{\partial x \partial y}S_k(x, y, \sigma) & \frac{\partial^2}{\partial y^2}S_k(x, y, \sigma) \end{bmatrix}$$

and the response function may be the determinant of $H_k$, $R_k(x,y,\sigma)=\det(H_k(x,y,\sigma))$. In this regard, the example embodiments described herein may use of the Haar-wavelet approximation in SURF when reference is made to the Hessian matrix.

In order to compute interest points in incremental video frames, example embodiments of the present invention may predict regions in the Gaussian image stack where useful features are likely to appear, and compute the response $R_k$ in the predicted regions. An input video sequence may be denoted as $I=\{I_0, I_1, \ldots I_{N-1}\}$. Given an image $I_{k-1}$, an associated interest point $p_{k-1}=(x_{k-1}, y_{k-1}, \sigma_{k-1})$, and the relative motion $M_k^{k-1}(\cdot)$ between $I_{k-1}$ and $I_k$ as a homography, example embodiments may transform $p_{k-1}$ to its location in frame $I_k$ with $$p_k=(x_k,y_k,\sigma_k)=M_k^{k-1}(p_{k-1}).$$

In some example embodiments, the transformation may be performed when the relative motion between $I_{k-1}$ and $I_k$ is small. Further, the transformation may be performed to expand the point $p_k$ into a three dimensional volume search neighborhood $p_k$ $$P_k = \left\{(x'_k, y'_k, \sigma'_k): \begin{array}{l} |\sigma'_k - \sigma_k| \leq \Delta_\sigma, \\ |x'_k - x_k| \leq \gamma\sigma'_k, \\ |y'_k - y_k| \leq \gamma\sigma'_k \end{array}\right\}$$

where $\Delta_\sigma$ is the search range in the scale space, and $\gamma$ is related to the motion prediction error, as well as disparity of the tracked point with respect to the primary planar structure of the scene. The search neighborhood $P_k$ may correspond to a pyramidal frustum because the interest point sampling rate may be reduced at higher scale levels. As a result of high correlation between images, a fixed-size search neighborhood may be used in some example embodiments. The collection of tracked interest points $\{p_{k-1}^0, p_{k-1}^1, \ldots, p_{k-1}^{m-1}\}$ from image $I_{k-1}$ may form a joint neighborhood $P'_k=\{P_k^0 \cup P_{k-1}^1 \ldots \cup P_k^{m-1}\}$ where useful interest points are likely to appear.

In addition to $P'_k$, example embodiments may consider parts of the image $I_k$ that are newly captured portions of the scene. To this end, example embodiments may maintain a keyframe identifier (ID) j, accumulate the motion between image $I_j$ and $I_k$ and transform the four corners of the image $I_j$ and $I_k$ to perform tracking. When the overlap between the keyframe and the current image drops to a certain percentage, example embodiments may extract interest points from the part of image $I_k$ that lies outside of the shrunken quadrilateral. The keyframe identifier may then updated to the current frame k.

Example embodiments of the present invention also match interest points between images $I_{k-1}$ and $I_k$. According to some example embodiments, it may be assumed that an interest point $p_{k-1}^j$ in $I_{k-1}$ is also present in $I_k$ in the region $P_k^j$. When more than one interest point are detected in this region, example embodiments may choose the interest point that matches $p_{k-1}^j$ without computing an associated descriptor.

In this regard, various processes for matching the interest points in the respective video frames may be utilized. For example, in some embodiments a curvature method may be implemented. In SURF, because the response function may be an approximation to the determinant of the Hessian matrix, example embodiments can use the relationship between the two principal or dominant curvatures of each interest point as a signature of the interest point. Based on the scale-normalized Hessian matrix, example embodiments may compute eigenvectors of the matrix, namely $\lambda_1$ and $\lambda_2$, where $\lambda_1$ is greater than $\lambda_2$, and measure the curvature ratio $r_1=\lambda_1/\lambda_2$, which may be related to the edge response detection method used in SIFT $$r_2 = \frac{\text{trace}(H)^2}{\det(H)} = \frac{(r_1+1)^2}{r_1}.$$

Because the components of H have been calculated, computing ratio $r_2$ may be more efficient than calculating $r_1$. The feature with the smallest difference in $r_2$ may be treated as the matching interest point, if this difference does not exceed a user-defined threshold $\Delta r_2$.

In an alternative example embodiment, a Normalized Cross Correlation (NCC) method may be implemented to match the interest points. NCC is a technique for matching image regions and normally operates in the pixel intensity domain. With blob-type features, such as the features used by SURF, NCC may not be accurate because the image intensities surrounding the neighborhood of an interest point may not sufficiently vary. In addition, because the features may be detected in the scale level, the neighborhood for NCC may be adjusted according to the scale of the interest points. Therefore, NCC in the pixel intensity domain may not be a suitable mechanism in terms of both performance and match quality. However, the local neighborhood in the Hessian determinant domain may summarize the relationships of relative interest point intensities, and therefore NCC may be used to align two local constellations of features.

To perform the NCC in the Hessian domain, for each possible pair of interest points, example embodiments may construct a frustum around each interest point in domain R corresponding to, for example, 5×5×3 grid values, and compute the L2-norm between the two grids. Performing the analysis in this manner may be more efficient because dot-products at detected interest point locations may be computed. Similar to the curvature method, example embodiments may take the matching interest point that passes an NCC threshold $\Delta$NCC as the matching interest point.

Upon identifying matching interest points, a motion estimation may be performed. The interest point detection algorithm described above may utilize an estimation of relative motion. Estimating the motion $M_k^{k-1}$ may include prediction and correction operations. The matching of interest points may be utilized as part of the prediction operation to determine an associated motion vector. The correction operation may involve, given the matching pairs, using Random Sample Consensus (RANSAC) to fit a fundamental matrix model and reject incorrect matches accordingly. For various example embodiments, the tracking process may thereby produce accurate results with a small number of iterations to reject many of the false tracking results.

To compute the joint neighborhood $P'_k$, example embodiments may predict the homography $M_k^{k-1}$. Note that, in some example embodiments, the model computed in the correction operation need not be the homography $M_k^{k-1}$. A more general model may be used in the correction operation that allows more valid matches to go into the tracked interest point pool. In some instances, a constant velocity motion may be assumed, and the corrected motion may be reused, or, in other instances, no motion may be assumed. If a valid model can not be found in the correction operation, example embodiments may not have sufficient matches between images, and in this case $P'_k$ may revert back to the original image stack.

In some example embodiments, a descriptor may also be computed. Each tracked feature descriptor may be computed from a maintained list of tracked interest points. As a result of the decoupling described above, example embodiments need not compute any descriptors in order to perform tracking. However, when descriptors are computed for object recognition, a smooth frame rate analysis may be performed by putting the new interest points in a priority queue and computing associated descriptors when a time budget allows. Additionally, since the robustness of the descriptors may deteriorate over time, but the associated interest points may still be in use, particularly because the interest points may not be affine-invariant, example embodiments may invalidate old descriptors and place them in the priority queue to be refreshed.

To recognize and label objects rapidly, example embodiments may compute and maintain the descriptors from the set of tracked features and query the image database. Querying a database may be utilized, but in some instances, querying an entire database may be slow, particularly as the size of the database grows. Some example embodiments, organize the image database based on spatial relationships, and query only subsets of the database that are more likely to contain matching objects to speed the querying process.

In this regard, organizing the database images may be performed in a number of ways. For example, given a collection of database images V, example embodiments may create an undirected graph G=(V, E), where images form the nodes in the graph, and the edges E={$E_G \cup E_{ID}$} describe the relationships between the images. An edge $e_g \in E_G$ between two images may indicate a geometric relationship when these two images can be related through standard pairwise image matching. In this case, a geometric relationship may be the homography transform between these two images. Each image may also be further identified with one or more object identifiers, and two images sharing the same identifiers may also be connected by an additional edge $e_{id} \in E_{ID}$. FIG. 1b provides an example image graph generated using the organization process or provided by a processor performing the process.

During initialization of the organization process, example embodiments may compute the full SURF feature descriptors, or other types of descriptors, from the first video image and match them against images in G. In some example embodiments, an approximate nearest neighbor tree for some or all the image features may be constructed in the database followed by geometric verification, for example via RANSAC. Upon successfully identifying the matching images, the best image $v_k \in V$ may be marked as the current keynode, and the database images currently being considered may be reduced to the subgraph $G_k = (V_k, E_k)$, where $v_i \in V_k$ if the distance between $v_i$ and $v_k$ on the graph G is less than a fixed threshold, and $e_k = \{v_i, v_j\} \in E_k$ if $v_i \in V_k$ and $v_j \in V_k$. Once a keynode image and an associated object identifier are identified in the initialization stage, example embodiments may continuously match against the subgraph $G_k$ as new video frames are captured. Some example embodiments may continue querying the database using the subgraph at a relatively low cost when a threshold confidence value indicates that relevant object identifiers are reachable from the current keynode $v_k$ in G.

Various example embodiments may also compute the placement of the labels within the video frames. In this regard, matching features may be grouped according to their respective object identifiers, and object identifiers labels may be rendered at, for example, the geometric centroid of each feature group. The locations of the labels may remain static with respect to the feature group until a new keynode image is chosen.

At every new video frame, various example embodiments may employ the processes described herein to update the interest points, compute the homography against the previous video frame, and update the label location accordingly. According to some example embodiments, the object recognition algorithm may be implemented for newly revealed objects due to motion. To avoid running the matching algorithm frequently, features may be projected in $V_k$ to the current video frame, and if features corresponding to new object identifiers enter the video frame, the new features may be added to the list of tracked interest points, and the tracking operations may be implemented again before querying $G_k$.

Figure 2:
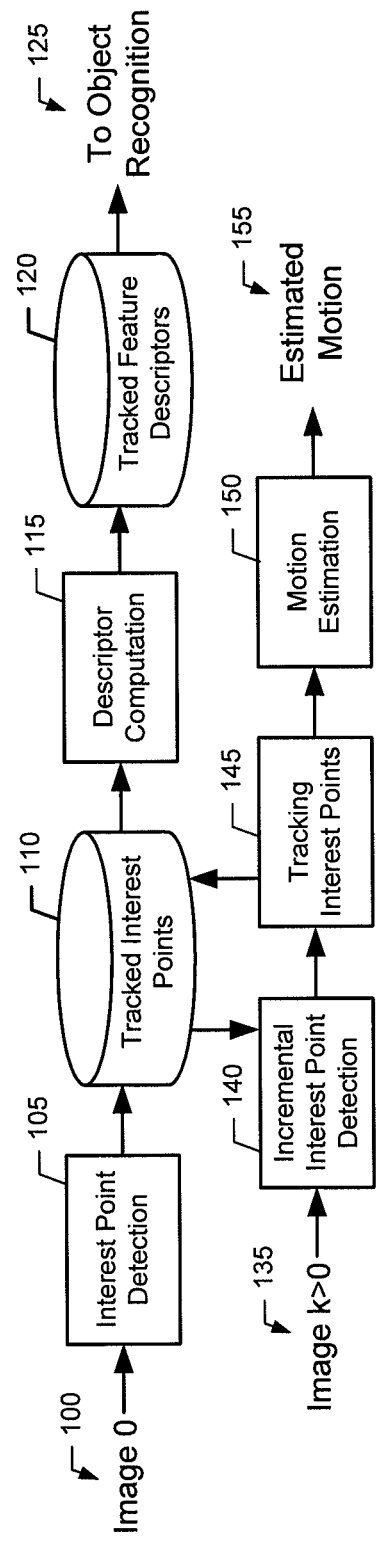
FIG. 2 is a flowchart of a method for object tracking according to various example embodiments of the present invention.

FIG. 2 illustrates a flowchart that describes an example sequencing of the operations and functionality described above. In this regard, FIG. 2 depicts the capturing of a video frame or image 0 at 100. At 105, the image 0 may be subjected to interest point detection. Additionally, FIG. 2 depicts the capturing of another video frame or image k>0 at 135. The image k>0 is subjected to an incremental interest point detection at 140. The interest points detected at 105 and 140 may be tracked or matched at 145 and may be stored as tracked interest points at 110. For tracking an object that has been previously recognized or identified, a motion estimation may be generated at 150 to determine estimated motion of the object at 155. In example embodiments where descriptor computation is to be performed, one or more of the tracked interest points may be considered to compute a descriptor at 115. The computed features or features may be stored at 120, possibly for tracking the feature descriptors. Subsequently, object recognition may be performed at 125 to identify an object. In some embodiments, upon recognizing an object, a video frame may be augmented to include a label.

Figure 3:
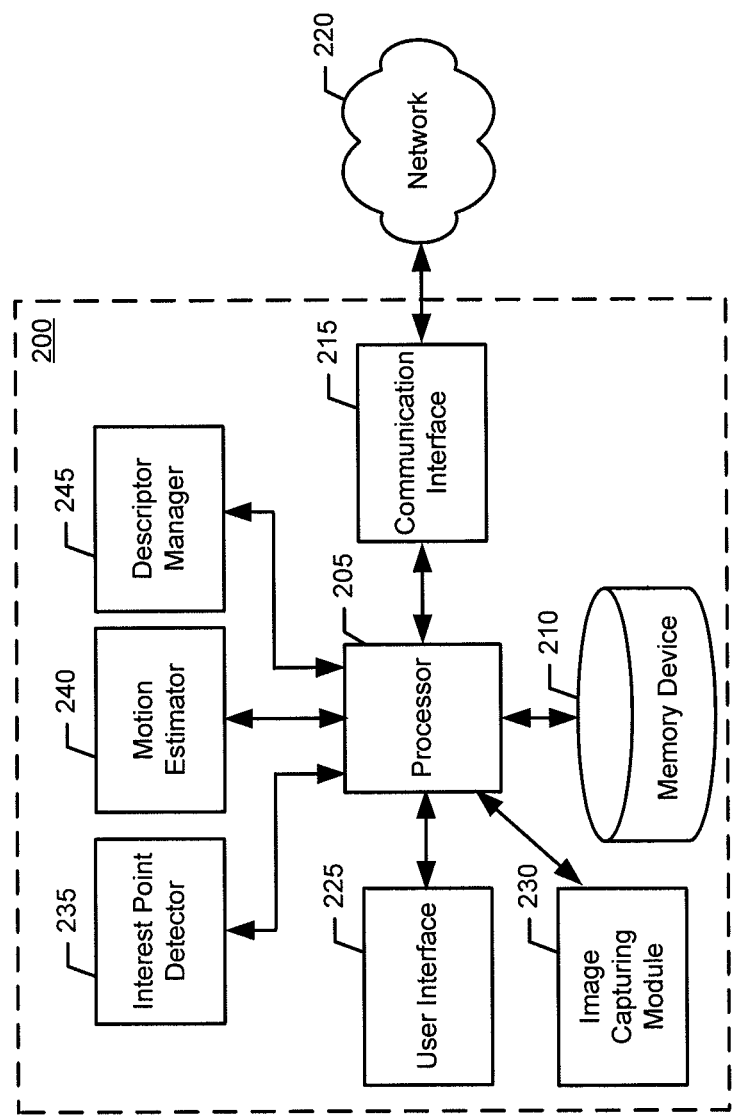
FIG. 3 is a block diagram of an apparatus for object tracking according to various example embodiments of the present invention.

The description provided above and herein illustrates example methods, apparatuses, and computer program products for object tracking. FIG. 3 illustrates another example embodiment of the present invention in the form of an example apparatus 200 that may be configured to perform various aspects of the present invention as described herein. The apparatus 200 may be configured to perform example methods of the present invention, such as those described with respect to FIGS. 2 and 4.

In some example embodiments, the apparatus 200 may, but need not, be embodied as, or included as a component of, a communications device with wired or wireless communications capabilities. Some examples of the apparatus 200, or devices that may include the apparatus 200, may include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware configured processor or a processor configured under software direction, computer-readable medium, or the like.

The apparatus 200 may include or otherwise be in communication with a processor 205, a memory device 210, and an image capturing module 230. In some embodiments, the apparatus 200 may also include a communications interface 215, a user interface 225, an interest point detector 235, a motion estimator 240, and/or a descriptor manager 245. The processor 205 may be embodied as various means including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. In some example embodiments, the processor 205 may, but need not, include one or more accompanying digital signal processors. In some example embodiments, the processor 205 may be configured to execute instructions stored in the memory device 210 or instructions otherwise accessible to the processor 205. As such, whether configured by hardware or software methods, or by a combination thereof, the processor 205 may represent an entity capable of performing operations according to embodiments of the present invention while configured accordingly. Thus, for example, when the processor 205 is embodied as an ASIC, FPGA or the like, the processor 205 may be specifically configured hardware for conducting the operations described herein. Alternatively, when the processor 205 is embodied as an executor of software instructions, the instructions may specifically configure the processor 205, which may otherwise be a general purpose processing element but for the specific configuration provided by the instructions, to perform the algorithms and operations described herein. However, in some cases, the processor 205 may be a processor of a specific device (e.g., a mobile terminal) adapted for employing embodiments of the present invention by further configuration of the processor 205 via executed instructions for performing the algorithms and operations described herein.

The memory device 210 may be one or more computer-readable storage media that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The communication interface 215 may be any device or means embodied in either hardware, a computer program product, or a combination of hardware and a computer program product that is configured to receive and/or transmit data from/to a network and/or any other device or module in communication with the apparatus 200. Processor 205 may also be configured to facilitate communications via the communications interface by, for example, controlling hardware and/or software included within the communications interface 215. In this regard, the communication interface 215 may include, for example, one or more antennas, a transmitter, a receiver, a transceiver and/or supporting hardware, including a processor or software for enabling communications with network 220. Via the communication interface 215 and the network 220, the apparatus 200 may communicate with various other network entities in a peer-to-peer fashion or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wigbee and/or the like The user interface 225 may be in communication with the processor 205 to receive user input at the user interface 225 and/or to present output to a user as, for example, audible, visual, mechanical or other output indications. The user interface 225 may include, for example, a keyboard, a mouse, a joystick, a display (e.g., a touch screen display), a microphone, a speaker, or other input/output mechanisms. In some example embodiments, the user interface 225 may be limited, or even eliminated.

In some embodiments, the apparatus 200 may also include a media item capturing module 230, such as a camera, video and/or audio module, in communication with the processor 205. The media item capturing module 230 may be any means for capturing images, such as in the form of a series of video frames, and/or audio for storage, display, or transmission. For example, in an exemplary embodiment in which the media item capturing module 230 is a camera, the camera may be configured to form and save a digital image file from an image captured by the camera. The media item capturing module 230 may be configured to capture media items in accordance with a number of capture settings. The capture settings may include, for example, focal length, zoom level, lens type, aperture, shutter timing, white balance, color, style (e.g., black and white, sepia, or the like), picture quality (e.g., pixel count), flash, red-eye correction, date, time, or the like. In some embodiments, the values of the capture settings (e.g., degree of zoom) may be obtained at the time a media item is captured and stored in association with the captured media item in a memory device, such as, memory device 210.

The media item capturing module 230 can include all hardware, such as a lens or other optical component(s), and software necessary for creating a digital image file from a captured image. The media item capturing module 230 may also include all hardware, such as a lens or other optical component(s), and software necessary to provide various media item capturing functionality, such as, for example, image zooming functionality. Image zooming functionality can include the ability to magnify or de-magnify an image prior to or subsequent to capturing an image.

Alternatively, the media item capturing module 230 may include only the hardware needed to view an image, while a memory device, such as the memory device 230 of the apparatus 200 stores instructions for execution by the processor 205 in the form of software necessary to create a digital image file from a captured image. In an exemplary embodiment, the media item capturing module 230 may further include a processor or co-processor which assists the processor 205 in processing image data and an encoder and/or decoder for compressing and/or decompressing image data. The encoder and/or decoder may encode and/or decode according to, for example, a joint photographic experts group (JPEG) standard or other format.

The interest point detector 235, the motion estimator 240, and the descriptor manager 245 of apparatus 200 may be any means or device embodied, partially or wholly, in hardware, a computer program product, or a combination of hardware and a computer program product, such as processor 205 implementing instructions to configure the apparatus 200, or a hardware configured processor 205, that is configured to carry out the functions of the interest point detector 235, the motion estimator 240, and/or the descriptor manager 245 as described herein. In an example embodiment, the processor 205 may include, or otherwise control the interest point detector 235, the motion estimator 240, and/or the descriptor manager 245. The interest point detector 235, the motion estimator 240, and/or the descriptor manager 245 may be, partially or wholly, embodied as processors similar to, but separate from processor 205. In this regard, the interest point detector 235, the motion estimator 240, and/or the descriptor manager 245 may be in communication with the processor 205. In various example embodiments, the interest point detector 235, the motion estimator 240, and/or the descriptor manager 245 may, partially or wholly, reside on differing apparatuses such that some or all of the functionality of the interest point detector 235, the motion estimator 240, and/or the descriptor manager 245 may be performed by a first apparatus, and the remainder of the functionality of the interest point detector 235, the motion estimator 240, and/or the descriptor manager 245 may be performed by one or more other apparatuses.

The interest point detector 235 may be configured to cause the apparatus 200 to identify a first interest point. In some example embodiments, the first interest point may be identified by detecting the first interest point in a video frame. In some embodiments, the first interest point may be provided to the interest point detector 235 by another entity. The interest point detector 235 may also be configured to cause the apparatus 200 to receive a video frame. The video frame may be received directly or indirectly from the image capturing module 230.

According to various example embodiments, the interest point detector 235 may also be configured to cause the apparatus 200 to detect a second interest point in a subsequent video frame using a scale space image pyramid. The scale space image pyramid may comprise a Hessian-Affine, Harris-Affine, approximate Hessian scale space, or the like. In some example embodiments, the interest point detector 235 may be configured to cause the apparatus to define a neighborhood for the first interest point and detect the second interest point within the neighborhood. The neighborhood may describe a portion of the scale space image pyramid. The motion estimator 240 may be configured to cause the apparatus 200 to match the second interest point with the first interest point and determine a motion estimation based on the matched interest points. In some example embodiments, the motion estimator 240 may be configured to cause the apparatus 200 to match the second interest point with the first interest point by identifying a relationship between dominant curvatures of the first interest point and dominant curvatures of the second interest point. In this regard, the curvatures may be utilized as signatures of the respective interest points. Further, in some example embodiments, the motion estimator 240 may be configured to cause the apparatus 200 to compare the interest points within the scale space using Normalized Cross Correlation (NCC).

The descriptor manager 245 may be configured to cause the apparatus 200 to generate a feature descriptor based at least on the second interest point. In this regard, in some example embodiments the computed feature descriptor may be a Speeded Up Robust Feature (SURF) feature, a Scale-Invariant Feature Transform (SIFT) feature, or a Gradient Location and Orientation Histogram (GLOH) feature. Additionally, in some example embodiments, the descriptor manager 245 may be configured to identify an object associated with the feature descriptor, and augment the video frame to include a label associated with the object. In this regard, the label may be positioned within a video frame based on the matched interest points.

Figure 4:
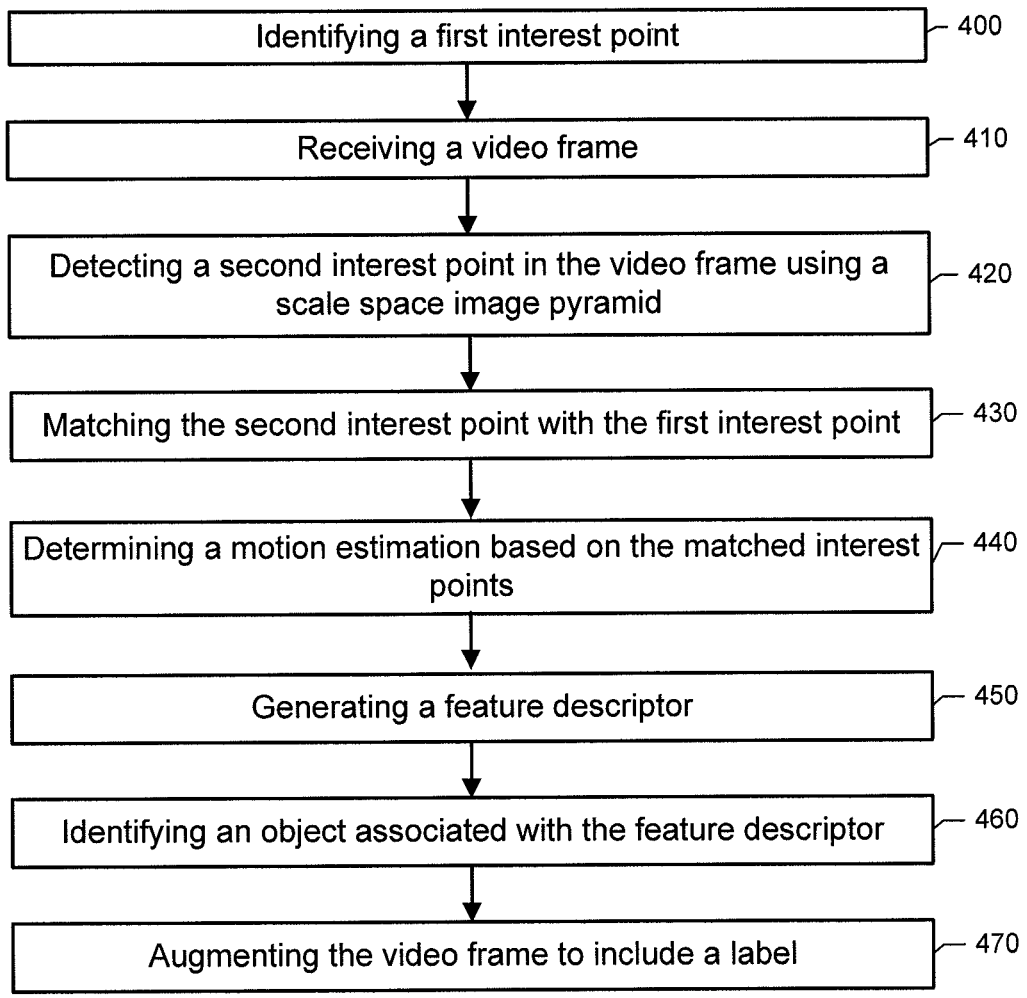
FIG. 4 is another flowchart of a method for object tracking according to various example embodiments of the present invention.

FIGS. 2 and 4 illustrate flowcharts of a system, method, and computer program product according to example embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, and/or combinations of the blocks, steps or operations in the flowcharts may include hardware, and/or a computer program product including one or more computer program code instructions, program instructions, or executable computer-readable program code instructions. In one example embodiment, one or more of the procedures described herein may be embodied by a computer program product including program code instructions. In this regard, the program code instructions may be stored by or on a memory device, such as memory device 210, of an apparatus, such as apparatus 200, and executed by a processor, such as the processor 205. As will be appreciated, any such program code instructions may be loaded onto a computer or other programmable apparatus (e.g., processor 205, memory device 210) to produce a particular machine, such that the instructions which execute on the computer or other programmable apparatus create means for implementing the functions specified in the flowcharts block(s), step(s), or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture including instruction means which implement the function specified in the flowcharts' block(s), step(s), or operation(s). The program code instructions may also be loaded onto a computer, processor, or other programmable apparatus to configure the computer, processor, or other programmable apparatus to execute a series of operational steps to be performed on or by the computer, processor, or other programmable apparatus. Execution of the program code instructions may produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowcharts support combinations of means for performing the specified functions, combinations of steps for performing the specified functions, and program code instruction means for performing the specified functions. It will also be understood that one or more blocks, steps, or operations of the flowcharts, and combinations of blocks, steps, or operations in the flowcharts, can be implemented by special purpose hardware-based computer systems and/or processors which perform the specified functions or steps, or combinations of special purpose hardware and program code instructions.

FIG. 4 depicts an example method for object tracking according to various embodiments of the present invention. The example method may include identifying a first interest point at 400. In some example embodiments identifying the first interest point may include detecting the first interest point in a video frame.

The example method may also include receiving a video frame at 410 and detecting a second interest point in the received video frame using a scale space image pyramid at 420. In some example embodiments, detecting the second interest point may include defining a neighborhood based on, for example, the location of the first interest point. In this regard, the neighborhood may be a portion of the scale space image pyramid and the second interest point may be detected within the neighborhood. Additionally, or alternatively, the scale space image pyramid may be a Hessian-Affine, a Harris-Affine, an approximate Hessian scale space, or the like.

The example method of FIG. 4 may also include matching the second interest point with the first interest point at 430. In some example embodiments, matching the interest points includes identifying a relationship between dominant curvatures of the first interest point and dominant curvatures of the second interest point. In this regard, the curvatures of the interest points may be utilized as unique signatures for the respective interest points. Additionally, or alternatively, matching the interest points may include comparing the interest points within the scale space using Normalized Cross Correlation (NCC).

The example method may also include determining a motion estimation based on the matched interest points at 440. In some example embodiments, the example method also includes computing or generating a feature descriptor at 450. The feature descriptor may be computed or generated based on at least one of the interest points. Further, in some embodiments, the feature descriptor may be a Speeded Up Robust Feature (SURF) feature, a Scale-Invariant Feature Transform (SIFT) feature, or a Gradient Location and Orientation Histogram (GLOH) feature.

Additionally, in some example embodiments, the example method may include identifying an object associated with the feature descriptor at 460. Further, at 470, the example method may include augmenting the video frame to include a label associated with the object. In this regard, the label may be positioned within the video frame based on the matched interest points.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   identifying a first interest point;
   receiving a first video frame;
   defining a neighborhood for the first interest point;
   detecting, via a processor, a second interest point in the neighborhood of the first video frame using a scale space image pyramid, the neighborhood being a portion of the scale space image pyramid;
   matching the second interest point with the first interest point;
   determining a motion estimation based on the matched interest points;
   generating a feature descriptor based at least on the second interest point;
   identifying a type of an object associated with the feature descriptor;
   augmenting the first video frame to include a label identifying the type of the object, the label being positioned within the first video frame based on the matched interest points;
   tracking the object in a subsequent video frame and within the neighborhood without recalculating the feature descriptor for the subsequent video frame; and
   augmenting the subsequent video frame such that the position of the label is updated with respect to the first video frame.

2. The method according to claim 1, wherein detecting the second interest point in the first video frame using a scale space image pyramid includes detecting a second interest point in the first video frame using a scale space image pyramid, the scale space image pyramid comprising a Hessian-Affine, Harris-Affine, or approximate Hessian scale space.

3. The method according to claim 1, wherein matching the second interest point with the first interest point includes identifying a relationship between dominant curvatures of the first interest point and dominant curvatures of the second interest point, the curvatures being utilized as signatures of the respective interest points.

4. The method according to claim 1, wherein matching the second interest point with the first interest point includes comparing the interest points within the scale space using normalized cross correlation.

5. The method according to claim 1 further comprising computing a feature descriptor based on at least the second interest point, the feature descriptor being a speeded up robust feature, a scale-invariant feature transform feature, or a gradient location and orientation histogram feature.

6. The method according to claim 1, wherein identifying the type of the object comprises searching a database for another object having a similar feature descriptor.

7. The method of claim 1, further comprising:
   prior to tracking the object in the subsequent video frame, transforming the neighborhood based on a relative change in motion between the first video frame and the subsequent video frame.

8. The method of claim 1, further comprising: determining based on a relative change in motion between the subsequent video frame and another subsequent video frame to recalculate the feature descriptor in the another subsequent video frame.

9. The method of claim 1, further comprising: transforming four corners of the subsequent video frame such that the overlap between the subsequent video frame and the first video frame drops to a certain percentage.

10. An apparatus comprising a processor and a memory storing executable instructions that, in response to execution by the processor, cause the apparatus to at least:
    identify a first interest point;
    receive a first video frame;
    define a neighborhood for the first interest point;
    detect a second interest point in the neighborhood of the first video frame using a scale space image pyramid, the neighborhood being a portion of the scale space image pyramid;
    match the second interest point with the first interest point;
    determine a motion estimation based on the matched interest points;
    generate a feature descriptor based at least on the second interest point;
    identify a type of an object associated with the feature descriptor;
    augment the first video frame to include a label identifying the type of the object, the label being positioned within the first video frame based on the matched interest points;
    track the object in a subsequent video frame and without recalculating the feature descriptor for the subsequent video frame; and
    augment the subsequent video frame such that the position of the label is updated with respect to the first video frame.

11. The apparatus according to claim 10, wherein the executable instructions that cause the apparatus to detect the second interest point in the first video frame using a scale space image pyramid include causing the apparatus to detect a second interest point in the first video frame using a scale space image pyramid, the scale space image pyramid comprising a Hessian-Affine, HarrisAffine, or approximate Hessian scale space.

12. The apparatus according to claim 10, wherein the executable instructions that cause the apparatus to match the second interest point with the first interest point include causing the apparatus to identify a relationship between dominant curvatures of the first interest point and dominant curvatures of the second interest point, the curvatures being utilized as signatures of the respective interest points.

13. The apparatus according to claim 10, wherein the executable instructions that cause the apparatus to match the second interest point with the first interest point include causing the apparatus to compare the interest points within the scale space using normalized cross correlation.

14. The apparatus according to claim 10, wherein the executable instructions further cause the apparatus to compute a feature descriptor based on at least the second interest point, the feature descriptor being a speeded up robust feature, a scale-invariant feature transform feature, or a gradient location and orientation histogram feature.

15. The apparatus according to claim 10, wherein the apparatus comprises a mobile terminal.

16. A computer program product comprising at least one non-transitory computer-readable storage medium having executable computer-readable program code instructions stored therein, the computer-readable program code instructions configured to:
- identify a first interest point;
- receive a first video frame;
- define a neighborhood for the first interest point;
- detect a second interest point in the neighborhood of the first video frame using a scale space image pyramid, the neighborhood being a portion of the scale space image pyramid;
- match the second interest point with the first interest point;
- determine a motion estimation based on the matched interest points;
- generate a feature descriptor based at least on the second interest point;
- identify a type of an object associated with the feature descriptor;
- augment the first video frame to include a label identifying the type of the object, the label being positioned within the first video frame based on the matched interest points;
- track the object in a subsequent video frame and within the neighborhood without recalculating the feature descriptor for the subsequent video frame; and
- augment the subsequent video frame such that the position of the label is updated with respect to the first video frame.

\* \* \* \* \*